Patented Nov. 28, 1933

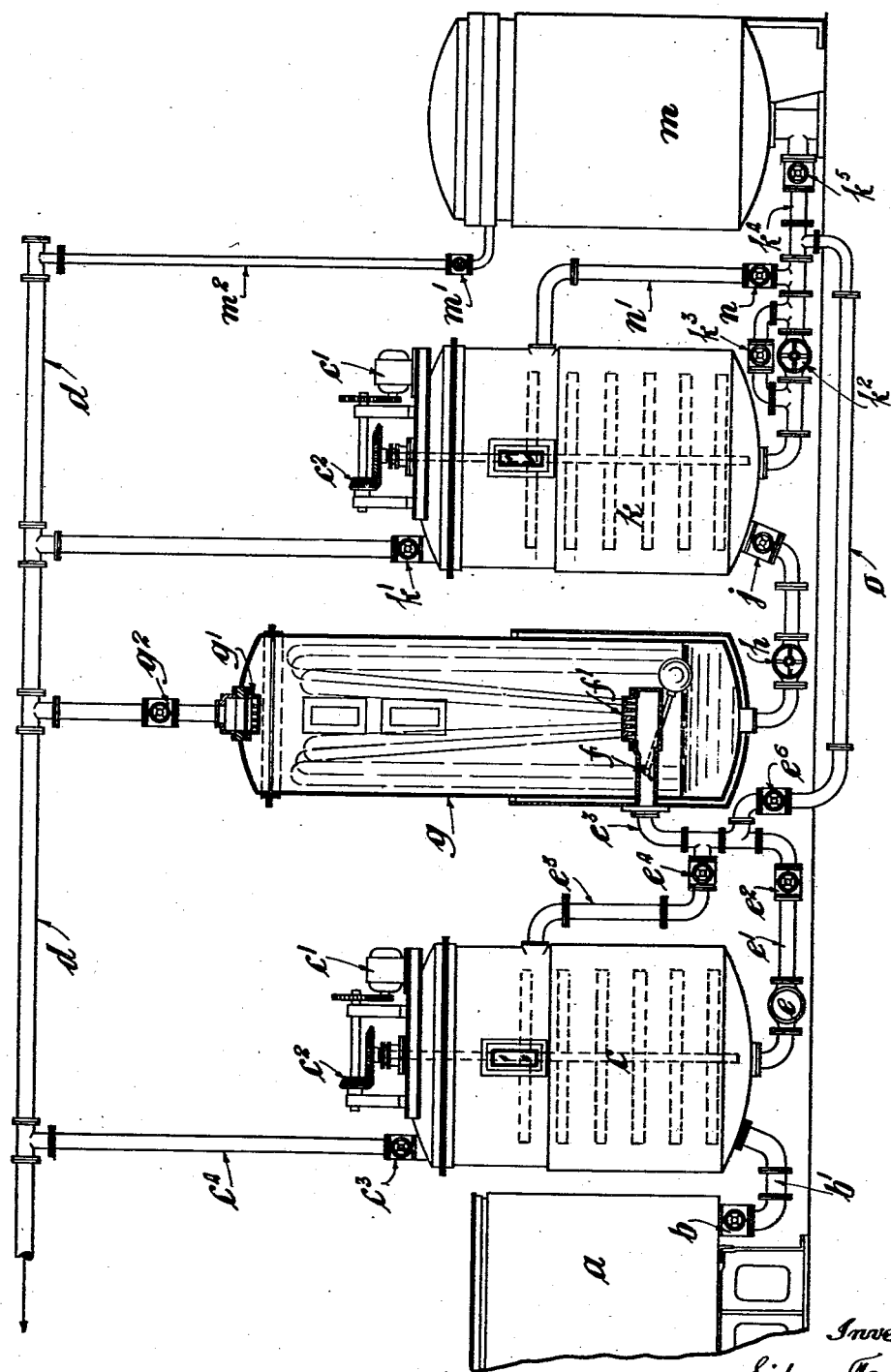

1,937,256

UNITED STATES PATENT OFFICE 1,937,256

APPARATUS FOR IMPREGNATING THE COVERINGS OF ELECTRIC CABLES AND THE LIKE WITH OIL OR THE LIKE

Sidney Taylor, Radcliffe, near Manchester, England

Application January 4, 1929, Serial No. 330,278, and in Great Britain March 20, 1928

9 Claims. (Cl. 91—68)

This invention refers to new or improved apparatus for and an improved method of impregnating the coverings of electric cables and the like with oil or the like.

In apparatus for this purpose it is necessary to dry and degasify the oil to prepare it prior to its being used to impregnate the cable and other coverings for which impregnation the oil is generally heated, and in order to use the oil to the best advantage, it is desirable that after each impregnation the excess oil should be kept from the air as far as possible, and in its original prepared condition so as to be capable of being used repeatedly without need for again drying and degasifying. That is to say the oil, if exposed while hot to the atmosphere, very quickly absorbs air and moisture.

The present invention has for its object to improve the quality of the impregnation and by providing a complete cycle of operation to obtain an efficient process and plant therefor.

According to the invention the oil is treated under vacuum for the removal of air and moisture and is maintained under vacuum or isolated from the atmosphere before and during the impregnation process. According to the further feature of the invention the surplus oil is removed while the vacuum is maintained and is stored under vacuum and is thus available for further use without having to be retreated. Further features of the invention consists in the apparatus for carrying out the processes of the invention.

The accompanying drawing illustrates diagrammatically one system of apparatus for carrying the invention into effect.

As shown in the drawing, $a$ is the mixing and melting tank in which the impregnating oil is first prepared. The tank $a$ is connected by valve $b$ and pipe $b^1$ to the bottom of a vacuum tank $c$ in which is provided mechanical means for agitation driven by an electric motor $c^1$ through gearing $c^2$. The vacuum tank $c$ is connected by a valve $c^3$ and pipe $c^4$ to a main vacuum pipe $d$ leading to a condenser and vacuum pump not shown. From the bottom of the vacuum tank $c$ is a connection to a pump $e$ which is connected by a pipe $e^1$, valve $e^2$, and pipe $e^3$ to a float controlled valve $f$ in the side of the de-aerating chamber $g$. The pipe $e^3$ has two branch connections, one through a relief valve $e^4$ and pipe $e^5$ to the side of the vacuum tank $c$ and the other to a valve $e^6$ for a pipe connection $o$ to be referred to later. Within the de-aerating chamber $g$ is a spray device $f^1$ connected to the float controlled valve $f$ and adapted for spraying the oil up into the chamber. At the top of the chamber is a catch pot $g^1$ connected by valve $g^2$ to the vacuum main $d$. At the bottom of the de-aerating chamber $g$ is a connection to a pump $h$ and to a valve $j$ in the lower part of the vacuum storage tank $k$ which is also provided with means for mechanical agitation. The vacuum storage tank $k$ is connected at the top by a valve $k^1$ to the vacuum main $d$ and at the bottom to a combined vacuum and pressure pump $k^2$ having a reversible motor, not shown, and a bye-pass valve $k^3$. From the pump $k^2$ is a pipe connection $k^4$ to a valve $k^5$ in the bottom of the impregnator tank $m$. From this pipe $k$ are two branch connections comprising a relief valve $n$ and relief pipe $n^1$ to the side of the vacuum storage tank $k$ and a pipe $o$ leading to the valve $e^6$ as previously referred to. The impregnator tank $m$ is provided with a valve $m^1$ and connection $m^2$ to the vacuum main $d$. All the vessels for the process are jacketed and connected to a steam or to a heat exchange oil circulating system for the effective control of temperatures throughout the apparatus. The several tanks and chambers in the apparatus are provided with inspection or sight glasses.

In use, the oil is mixed and melted in the first tank $a$ from which it is transferred to the vacuum tank $c$ where it is given a thorough mixing under vacuum, in which stage the de-hydration and de-aeration of the oil is started. From the vacuum tank $c$ the oil is pumped into the de-aerating chamber $g$ into which it issues as a spray and from which it passes to the vacuum storage tank $k$.

The oil thus prepared is ready for use for impregnation and its mixture may be maintained by means of the mechanical mixer provided in the tank $k$. The cable to be impregnated is placed in the impregnator tank $m$, which is then closed, and subjected to a vacuum. When the tank $m$ is sufficiently exhausted and the cable effectively dried and de-aerated thereby, the oil is pumped into it until it is filled when the valve $m^1$ may be closed. The oil in the impregnator is thus completely isolated from the atmosphere and a pressure may be applied by means of the supply pump $k^2$, the relief valve $n$ being set to the required pressure. This pressure assists the impregnation and enables the created de-aerating properties of the prepared oil to assist in furthering the impregnation. When the impregnation is completed the oil is pumped back to the vacuum storage tank, before the impregnator tank is opened for removal of the treated cable. When desired the oil in the impregnator or in the vacuum storage tank may be returned to the tank c or to the de-aerating chamber g for further treatment.

The above is a complete apparatus and process for very fine quality impregnation but for commercial purposes where such quality is not essential the process may be carried out by the use of the tanks k and m only. In such a case the tank m may be used as a spray chamber for de-aeration, a pipe being taken from the pump $k^2$ to a rose or jet in the upper part of the tank. Alternatively, as an intermediate course, the tank a might well be dispensed with and the mixing be effected in the tank c, and/or the de-aerating chamber may be dispensed with and the tank c used for that purpose. Obviously there are many such modified forms of apparatus with which the invention may be carried into effect. The impregnating fluid may be oil and resin or other like mixtures.

What I claim is:—

1. The process for impregnating materials with oil to increase their di-electric properties wherein the oil is heated and treated under vacuum for the removal of air and moisture and the material to be impregnated is prepared under vacuum to remove air and moisture ready for the reception of the impregnating oil, including the step wherein the treated oil is brought into contact with the prepared material without the intervening exposure of either to the access of air or moisture.

2. The process according to claim 1, with the added step wherein the surplus oil is removed and stored for further use without exposure to the access of air or moisture.

3. Apparatus for impregnating materials with oil to increase their di-electric properties comprising two vacuum chambers, means for transferring the oil from chamber to chamber, while both are under vacuum.

4. In apparatus according to claim 3, means such as a valve for isolating the contained oil in one or either of the chambers and controlled means for creating a pressure therein, as set forth.

5. Apparatus for impregnating materials with oil to increase their di-electric properties comprising an agitated vacuum tank, a vacuum de-aerating chamber, an agitated vacuum storage tank, a vacuum impregnating tank and a system of pumps and piping for the intertransference of the oil between the chambers while under vacuum, as and for the purpose set forth.

6. In apparatus according to claim 5, pumps for transferring the oil while under vacuum, an isolation valve on the vacuum connection for the impregnating tank and an adjustable pressure release valve on the pump supplying the oil to the impregnating tank whereby a controlled pressure may be obtained therein during impregnation, as set forth.

7. An apparatus according to claim 3, in which one of said tanks is an impregnation tank and the other is an oil storage tank, in which both of said tanks are connected to a common vacuum main, in which the pipe leading from the impregnation tank to the vacuum main has a valve for closing the same, and in which there is a pipe leading from the lower interior of the storage tank to the impregnation tank, within which last mentioned pipe line there is included a pump whereby upon a closing of said valve, pressure within the impregnation tank can be created without the vacuum conditions within the system being destroyed.

8. The process of impregnating materials with oil to increase their di-electric properties within a system wherein the oil is heated and treated under vacuum for the removal of air and moisture and the material to be impregnated is prepared under vacuum to remove air and moisture ready for the reception of the impregnating oil, which process is carried out under conditions in such a manner that while the oil and the material to be impregnated therewith are maintained under vacuum conditions there is a starting of the transfer of oil from the receptacle containing the same into the receptacle containing the material, and which transfer is continued while the vacuum within the system is maintained under conditions that preclude any atmospheric flow into the material receptacle, whereby air and moisture cannot enter the material receptacle, and which transfer into said receptacle containing said material is continued until the required amount of oil is provided for impregnating the material, and thereafter causing the surplus oil to be removed while the vacuum is maintained and to be stored under vacuum whereby it is thus available for further use without having to be retreated.

9. The process to be carried out as defined in and by the claim last preceding, wherein incidental to the transfer of oil to the receptacle within which the material is impregnated, there is a closing off of the vacuum line leading from the receptacle and a further positive pumping of oil from the oil receptacle resulting in pressure being applied to the oil within the receptacle containing the material in order to assist the impregnation of the material by the prepared oil.

SIDNEY TAYLOR.